US009867048B2

(12) United States Patent
Metral

(10) Patent No.: US 9,867,048 B2
(45) Date of Patent: Jan. 9, 2018

(54) AUTOMATIC AUTHENTICATION OF A MOBILE DEVICE USING STORED AUTHENTICATION CREDENTIALS

(71) Applicant: PayPal, Inc., San Jose, CA (US)

(72) Inventor: Max Edward Metral, Brookline, MA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/586,099

(22) Filed: May 3, 2017

(65) Prior Publication Data

US 2017/0238182 A1 Aug. 17, 2017

Related U.S. Application Data

(63) Continuation of application No. 14/930,450, filed on Nov. 2, 2015, now abandoned, which is a continuation of application No. 14/039,124, filed on Sep. 27, 2013, now Pat. No. 9,178,889.

(51) Int. Cl.
*H04L 9/32* (2006.01)
*H04W 12/06* (2009.01)
*H04L 29/06* (2006.01)
*G06Q 20/10* (2012.01)

(52) U.S. Cl.
CPC ............ *H04W 12/06* (2013.01); *G06Q 20/10* (2013.01); *H04L 63/083* (2013.01); *H04L 63/0861* (2013.01); *H04L 63/0876* (2013.01); *H04L 63/10* (2013.01)

(58) Field of Classification Search
CPC ..... H04L 9/321; H04L 63/083; H04L 9/3226; H04L 63/0892

USPC .......................................................... 726/5
See application file for complete search history.

(56) References Cited

U.S. PATENT DOCUMENTS

| 6,181,712 B1 | 1/2001 | Rosengren |
| 8,001,379 B2 * | 8/2011 | Daskalopoulos ... H04L 63/0869 713/168 |
| 8,132,256 B2 * | 3/2012 | Bari ....................... G06Q 30/04 726/21 |
| 8,433,288 B2 | 4/2013 | Frew et al. |

(Continued)

FOREIGN PATENT DOCUMENTS

| JP | 2007/11791 | 1/2007 |
| WO | WO2010/116404 | 10/2010 |

OTHER PUBLICATIONS

IP Australia, "Patent Examination Report No. 1", dated Jun. 17, 2016, 3 pages.

(Continued)

*Primary Examiner* — Haresh N Patel
(74) *Attorney, Agent, or Firm* — Haynes and Boone, LLP

(57) ABSTRACT

Systems and methods are disclosed which may allow a user having a mobile device to automatically authenticate to a server using a device identifier associated with the mobile device. An access point may be configured to send the device identifier as well as additional identifying information to the server so that the device identifier can be accurately matched to the mobile device. Then, when the mobile device submits a credential during authentication, the device identifier and the credential may be matched such that the next time the server receives the device identifier from the access point, the mobile device may be automatically authenticated.

20 Claims, 6 Drawing Sheets

(56) References Cited

U.S. PATENT DOCUMENTS

| | | | |
|---|---|---|---|
| 8,649,398 B2 | 2/2014 | Shafai et al. | |
| 8,666,367 B2 | 3/2014 | Sharp et al. | |
| 8,683,566 B1* | 3/2014 | Gailloux | G06F 21/31 726/3 |
| 2004/0044720 A1* | 3/2004 | Jang | H04L 29/06 709/200 |
| 2008/0181239 A1* | 7/2008 | Wood | H04L 63/083 370/401 |
| 2008/0304505 A1* | 12/2008 | Kunii | G06F 13/1657 370/429 |
| 2008/0318591 A1 | 12/2008 | Oliver | |
| 2010/0167740 A1* | 7/2010 | Vakil | H04W 36/0083 455/436 |
| 2010/0279652 A1 | 11/2010 | Sharp et al. | |
| 2011/0093938 A1* | 4/2011 | Asokan | G06F 21/31 726/7 |
| 2011/0197267 A1* | 8/2011 | Gravel | H04L 9/321 726/5 |
| 2011/0209207 A1* | 8/2011 | Issa | G06F 21/552 726/7 |
| 2012/0236878 A1 | 9/2012 | Shafai et al. | |
| 2012/0329429 A1 | 12/2012 | Jabara et al. | |
| 2012/0330769 A1* | 12/2012 | Arceo | G06Q 20/4014 705/21 |
| 2013/0034047 A1* | 2/2013 | Chan | H04L 45/32 370/315 |
| 2013/0074164 A1 | 3/2013 | Bartlett | |
| 2013/0117850 A1* | 5/2013 | Britton | G06F 21/567 726/23 |
| 2013/0117854 A1* | 5/2013 | Britton | G06F 21/56 726/24 |
| 2013/0167196 A1 | 6/2013 | Spencer et al. | |
| 2013/0205361 A1* | 8/2013 | Narayanaswamy | H04W 12/12 726/1 |
| 2013/0231088 A1* | 9/2013 | Jabara | G06Q 10/101 455/411 |
| 2013/0298215 A1* | 11/2013 | Kuznetsov | H04L 9/3263 726/8 |
| 2014/0031057 A1* | 1/2014 | Brassil | H04W 12/06 455/456.1 |
| 2014/0082732 A1* | 3/2014 | Britton | G06F 21/56 726/24 |
| 2016/0057145 A1* | 2/2016 | Metral | H04L 63/10 726/5 |

OTHER PUBLICATIONS

Canadian Intellectual Property Office, "Examiner's Report", dated Feb. 10, 2017, 4 pages.
European Patent Office, "Supplementary European Search Report", dated Mar. 27, 2017, 4 pages.
European Patent Office, "Communication pursuant to Article 94(3) EPC", dated Apr. 7, 2017, 6 pages.
Patent Cooperation Treaty, "International Search Report", dated Dec. 12, 2014, 2 pages.
Japanese Patent Office, "Office Action", dated May 2, 2017, 7 pages.

* cited by examiner

AUTOMATIC AUTHENTICATION OF A MOBILE DEVICE USING STORED AUTHENTICATION CREDENTIALS

CROSS REFERENCE TO RELATED APPLICATION

The present application is a continuation of U.S. patent application Ser. No. 14/930,450 filed on Nov. 2, 2015, now abandoned, which is a continuation of U.S. patent application Ser. No. 14/039,124 filed on Sep. 27, 2013, and issued as U.S. Pat. No. 9,178,889 on Nov. 3, 2015, the contents of which is hereby incorporated by reference in their entirety for all purposes.

BACKGROUND

Technical Field

Embodiments disclosed herein are related to systems and methods for authentication using a device identifier. In particular, embodiments disclosed herein may match a device identifier with an authentication credential such that the device identifier may be used for authentication.

Related Art

Due to the increase in use of mobile devices and the improved networking and online capabilities of these mobile devices, merchants having physical, "brick and mortar" stores may also have an online presence to tap into the segment of the population using these connected mobile devices. The online presence may include online inventories, online ordering, online payment, and online-manageable loyalty programs. In addition, merchants may also want customers to be online using making use of the online presence while the customers are in their stores. As a result, merchants may provide and maintain access points in the stores and/or work with communications providers to ensure that cellular data networks adequately provide coverage in their stores.

In theory, the online presence provided by the merchant may be an added value for the merchant, increase customer satisfaction, and lead to increased repeat business for the merchant. However, the customers may have to perform the tedious process of authenticating or "logging in" every time that they visit the merchant. And, if the user does not log in on every visit, then neither the customers nor the merchants are fully benefitting from the online presence provided by the merchant.

Figure 1:
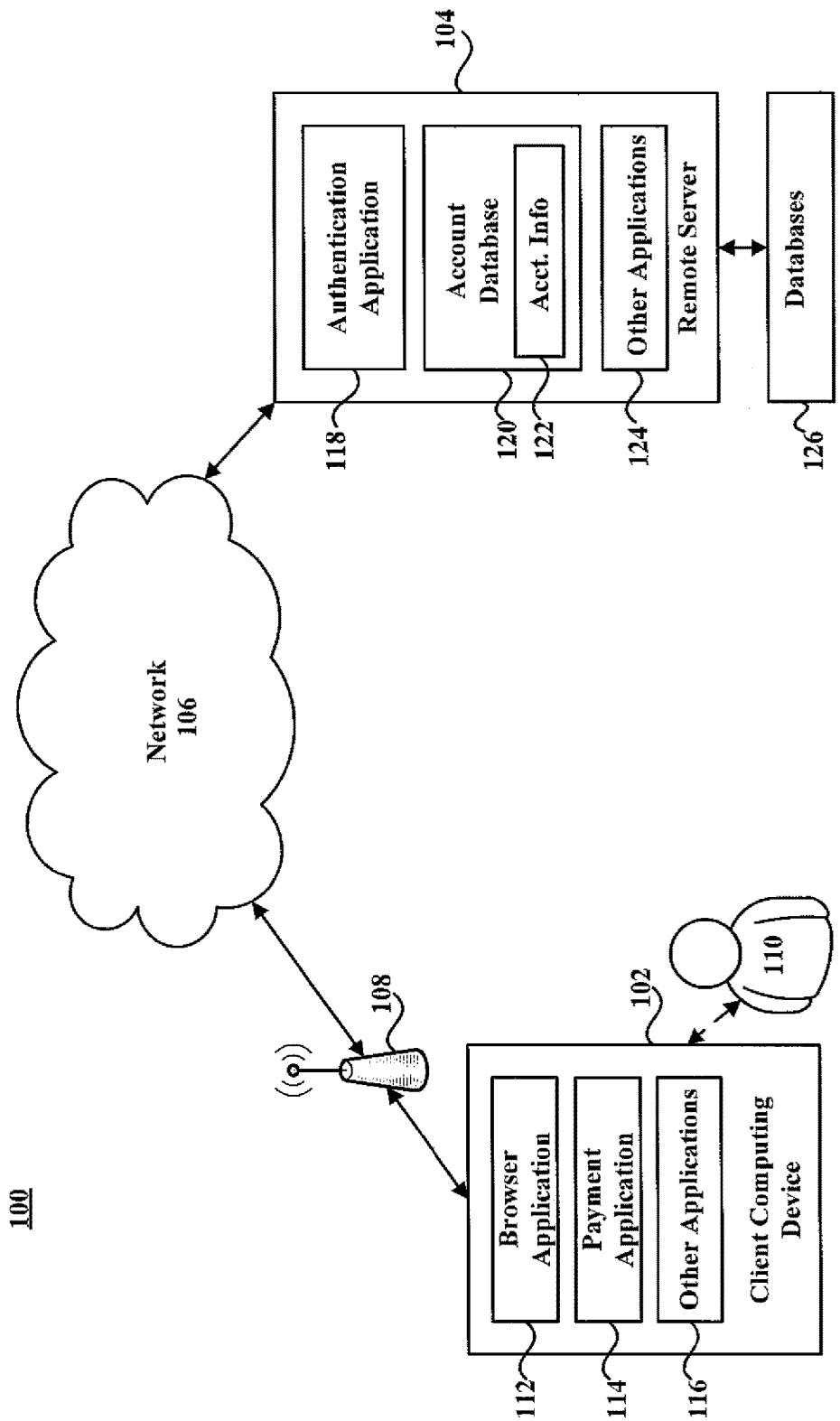
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Consistent with some embodiments, a system is provided. The system includes a network interface component configured to receive a request to authenticate including a credential, send packets, and receive information including a device identifier of a device that received or retransmitted the sent packets. The system also includes one or more processors configured to generate the packets, and pair the received credential to the received device identifier. The system also includes a memory storing the paired device identifier and credential.

Consistent with some embodiments, there is also provided a method. The method includes steps of receiving a request to authenticate to the server, the request to authenticate including a credential, sending in response to the request to authenticate, packets, receiving information including a device identifier of a device that received or retransmitted the sent packets, and pairing the received credential to the device identifier.

Consistent with some embodiments, there is further provided a method. The method includes steps of receiving a request to authenticate to the server, the request to authenticate including a credential, sending in response to the request to authenticate, executable instructions, receiving a device identifier from a device executing the executable instructions, and pairing the received credential to the device identifier when the device that sent the device identifier matches the device that sent the request to authenticate.

Embodiments consistent with this disclosure may allow a server to match a device identifier of a device with an authentication credential such that the device may be able to be automatically authenticated to the server upon subsequent receipts of the device identifier.

These and other embodiments will be described in further detail below with respect to the following figures.

FIG. 1 is a block diagram of a networked system 100, consistent with some embodiments. System 100 includes a client computing device 102 and a remote server 104 in communication over a network 106. Remote server 104 may be a payment processing service provider server that may be maintained by a payment processing service provider, such as PayPal, Inc. of San Jose, Calif. Remote server 104 may be maintained by other service providers in different embodiments. Remote server 104 may also be maintained by an entity with which sensitive credentials and information may be exchanged with client computing device 102. Remote server 104 may be more generally a web site, an online content manager, a service provider, such as a bank, or other entity who provides content to a user requiring user authentication or login.

Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 106. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices.

In some embodiments, client computing device 102 may be connected to network 106 via an access point 108. Access point 108 may be a wireless access point (WAP) that may facilitate wireless communications by client computing device 102 over network 106 according to one or more versions of the Institute of Electrical and Electronic Engineers (IEEE) 802.11 standard. Access point 108 may also be a wired router or bridge facilitating wireless communications over network 106 according to the IEEE 802.3 Ethernet standard. In some embodiments, access point 108 may be a mobile communications tower that facilitates wireless communications by client computing device 102 over network 106 according to a wireless networking standard such as CDMA or GSM 2G, 3G, 4G, HSDPA+, LTE, and other cellular data standards. The mobile communications tower may be a cellular base station, including lower power and smaller cellular base stations, such as a femtocell, picocell, or microcell. In some embodiments, client computing device 102 may be required to authenticate to access point 108 to connect to network 106. Moreover, access point 108 may be associated with remote server 104 such that access point 108 may be provided by an entity having an account with remote server 104 and access point 108 may be capable of providing information to remote server 104 over network 106. In some embodiments, access point 108 may be capable of receiving instructions and rules from remote server 104 for analyzing patterns of traffic sent by client computing device 102.

Client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. In some embodiments, the instructions may be executed by the one or more processors in response to interaction by user 110. For example, such instructions may include browser application 112 such as a mobile browser application, which may be used to provide a user interface to permit user 110 to browse information available over network 106, including information hosted by remote server 104. For example, browser application 112 may be implemented as a web browser to view information available over network 106. Browser application 112 may include a graphical user interface (GUI) that is configured to allow user 110 to interface and communicate with remote server 104 or other servers managed by content providers or merchants via network 106. For example, user 110 may be able to access websites to find and purchase items, as well as access user account information or web content.

Client computing device 102 may also include a payment application 114 that may allow user 110 to enter into and perform transactions over network 106, including authorizing payments to be processed by a payment service processing provider, such as may be provided by PayPal, Inc. of San Jose, Calif. and implemented by remote server 104. In some embodiments, user 110 may be a merchant or a customer, purchaser, or buyer. Client computing device 102 may include other applications 116 as may be desired in one or more embodiments to provide additional features available to user 110, including accessing a user account with remote server 104. For example, applications 116 may include interfaces and communication protocols that allow the user to receive and transmit information through network 106 and to remote server 104 and other online sites. Applications 116 may also include security applications for implementing client-side security features, programmatic client applications for interfacing with appropriate APIs over network 106 or various other types of generally known programs and/or applications. Applications 116 may include mobile applications downloaded and resident on client computing device 102 that enables user 110 to access content through the applications.

Remote server 104, according to some embodiments, may be maintained by an online payment provider, which may provide processing for online financial and payment transactions on behalf of user 110. Remote server 104 may also be maintained by a merchant and provide access to a merchants goods and services (collectively referred to as "items") that are for purchase and may provide a payment service processing for the purchased items. Remote server 104 may include at least authentication application 118, which may be configured to interact with client computing device 102 connected to network and remote server 104 via access point 108 to authenticate client computing device 102 to remote server 104. In some embodiments, authenticating client computing device 102 to remote server 104 may allow applications executing on client computing device 102, such as browser application 112 and/or payment application 114, to access features provided by remote server 104. Such features may include viewing items for purchase, selecting items for purchase, and paying for selected items, with an online payment provider such as PayPal, Inc. of San Jose, Calif., processing the payment.

Remote server 104 may also include an account database 120 that includes account information 122 for users having an account on remote server 104, such as user 110. In some embodiments, authentication application 118 may authenticate client computing device 102 to remote server based on information in account information 122 of account database 120. Remote server 104 may include other applications 124 and may also be in communication with one or more external databases 126, that may provide additional information that may be used by remote server 104. In some embodiments, databases 126 may be databases maintained by third parties, and may include third party account information of user 110.

Although discussion has been made of applications and applications on client computing device 102 and remote server 104, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the applications.

Figure 2:
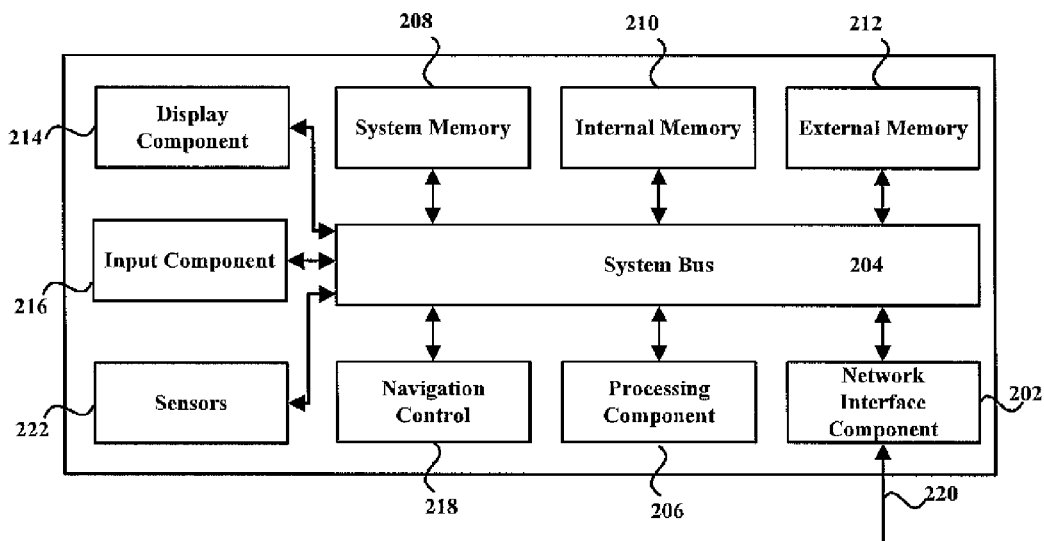
FIG. 2 is a diagram illustrating a computing system, consistent with some embodiments.

FIG. 2 is a diagram illustrating computing system 200, which may correspond to either of client computing device 102 or remote server 104, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 104. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 108. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 108.

Consistent with some embodiments, computing system 200 includes a system bus 204 for interconnecting various components within computing system 200 and communication information between the various components. Such components include a processing component 206, which may be one or more processors, micro-controllers, graphics processing units (GPUs) or digital signal processors (DSPs), a system memory component 208, which may correspond to random access memory (RAM), an internal memory component 210, which may correspond to read-only memory (ROM), and an external or static memory 212, which may correspond to optical, magnetic, or solid-state memories. Consistent with some embodiments, computing system 200 further includes a display component 214 for displaying information to a user 120 of computing system 200. Display component 214 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 216, allowing for a user 120 of computing system 200 to input information to computing system 200. Such information could include payment information such as an amount required to complete a transaction, account information, authentication information such as a credential, or identification information. An input component 216 may include, for example, a keyboard or key pad, whether physical or virtual. Computing system 200 may further include a navigation control component 218, configured to allow a user to navigate along display component 214. Consistent with some embodiments, navigation control component 218 may be a mouse, a trackball, or other such device. Moreover, if device 200 includes a touch screen, display component 214, input component 216, and navigation control 218 may be a single integrated component, such as a capacitive sensor-based touch screen.

Computing system 200 may perform specific operations by processing component 206 executing one or more sequences of instructions contained in system memory component 208, internal memory component 210, and/or external or static memory 212. In other embodiments, hard-wired circuitry may be used in place of or in combination with software instructions to implement the present disclosure. Logic may be encoded in a computer readable medium, which may refer to any medium that participates in providing instructions to processing component 206 for execution. Such a medium may take many forms, including but not limited to, non-volatile media and volatile media. The medium may correspond to any of system memory 208, internal memory 210 and/or external or static memory 212. Consistent with some embodiments, the computer readable medium is tangible and non-transitory. In various implementations, non-volatile media include optical or magnetic disks and volatile media includes dynamic memory. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 220 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 220 and network interface component 202. Communication link 220 may be wireless through a wireless data protocol such as Wi-Fi™, 3G, 4G, HDSPA, LTE, RF, NFC, or through a wired connection. Network interface component 202 may include an antenna, either separate or integrated, to enable transmission and reception via communication link 220. Received program code may be executed by processing component 206 as received and/or stored in memory 208, 210, or 212.

Computing system 200 may also include sensor components 222. Sensor components 222 may include any sensory device that captures information related to the surroundings of computing system 200. Sensor components 222 may include camera and imaging components, accelerometers, GPS devices, motion capture devices, and biometric sensors, and other devices that are capable of providing information about computing system 200, user 120, or their surroundings. In some embodiments, sensor components 222 including an accelerometer may be used to detect a motion of computing system 200 made by a user that may be indicative of a user recognition of a displayed character or digit of a credential. Sensor components 222 may include a microphone configured to detect a voice of user 120 and translate the detected voice into an electrical signal that may be interpreted by processing component as corresponding to text or characters.

In some embodiments, access point 108 may be similar to computing system 200 and include similar components to computing system 200. For example, access point 108 may include one or more memories 208-212, a processing component 206 including one or more processors, a network interface component 202, and a system bus 204 for interconnecting these components. In general, access point 108 may have components configured to connect a device, such as client computing device 102 to network 106. In some embodiments, access point 108 may be capable of receiving instructions from remote server 104 that, when executed by one or more processors of remote server 104, may allow access point 108 to facilitate the analysis of information received from one or more client computing devices 102, including analyzing patterns of received network traffic.

A merchant having a physical, brick and mortar store as well as an online presence, including but not limited to, an online inventory, online ordering, online payment, and online-manageable loyalty programs, may wish to provide these online features to a customer when the customer is in the physical store. For example, a merchant may allow user 110 having client computing device 102 to enter their store, find an item for purchase, and allow user to pay for the item using client computing device 102, and then show proof of payment to the merchant before user 110 can exit the store with the item. To allow this, the merchant may require that user authenticate to remote server 104 and/or check in to perform these actions. As another example, user 110 may be part of a loyalty program of the store, and may be provided with coupons or offers when user 110 authenticates to remote server 104 when in the store and/or checks in to the store, with such coupons or offers being provided to client computing device 102 for scanning by the merchant.

In theory, the online presence provided by the merchant may be an added value for the merchant, increase customer satisfaction, and lead to increased repeat business for the merchant. However, the customer, such as user 110 may have to perform the tedious process of authenticating to check in with remote server 104 every time that they visit the merchant. Moreover, if user 110 does not authenticate to remote server 104 to check in on every visit, then neither user 110 nor the merchant are fully benefitting from the online presence.

Computing devices, such as client computing device 102 may typically send out a broadcast packet when looking for access point 108 to connect to network 106. The broadcast packet may be a simple packet that includes a to address which may typically be an "all" message in the form of 0xFF:FF:FF:FF:FF:FF, and a from address that includes a device identifier associated with client computing device 102. In some embodiments, the device identifier may be a media access control (MAC) address of client computing device 102 for connecting to network 106 via an access point that provides an 802.11 or 802.3 connection. In some embodiments, the device identifier may be an International Mobile Station Equipment Identity (IMEI) number of client computing device 102 for connecting to network 106 via an access point that provides a CDMA or GSM data connection. In general, the device identifier, whether IMEI or MAC is unique for the device. Consequently, client computing device 102 may be recognizable by the device identifier that is provided to access point 108.

When client computing device 102 is connected to network 106 and authenticates to remote server 104, client computing device 102 may have to provide a credential to remote server 104 for authentication. In some embodiments, the credential may one or more passwords, codes, personal identification numbers (PINs), user names, biometric identifiers, and the like. Since the device identifier is unique to the device, tying the device identifier to a credential used to authenticate with remote server 104 could provide a way to automatically authenticate client computing device 102 to remote server 104 when access point 108 associated with remote server 104 receives the device identifier. However, the credential has to first be tied to the device identifier which may not necessarily be provided to remote server 104 in all instances. Accordingly, authenticating using a device identifier may require matching the device identifier to the credential on a first attempt, and then using the device identifier for future authentication.

Figure 3:
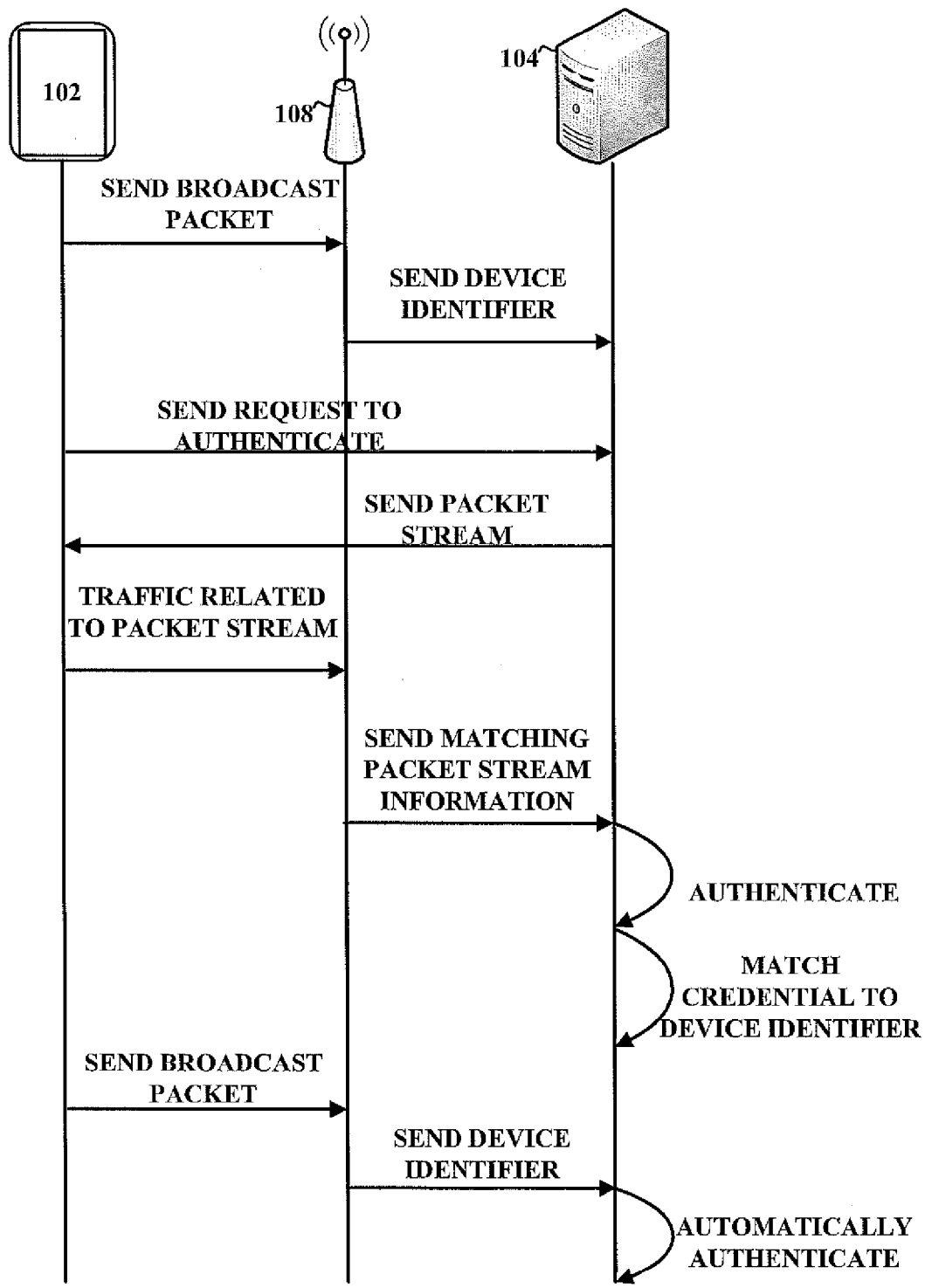
FIG. 3 is a diagram illustrating a flow of authenticating using a device identifier, consistent with some embodiments.

FIG. 3 is a diagram illustrating a flow of authenticating using a device identifier, consistent with some embodiments. As shown in FIG. 3, client computing device 102 may send out one or more broadcast packets that include a device identifier of client computing device 102 when client computing device 102 is attempting to connect to network 106. Access point 108 may receive any number of these broadcast packets and device identifiers as client computing devices 102 pass within range of access point 108. Access point 108 may be configured to provide these device identifiers and the traffic associated with the device identifiers to remote server 104. In some embodiments, access point 108 may be capable of receiving rules from remote server 104 that specify the type of information to send to remoter server 104, such as types of packets and device identifiers. Client computing device 102 may then send a request to authenticate with remote server 104 to, for example, access features provided by remote server 104, such as those discussed previously. The request may include a credential used for authenticating with remote server 104 to, for example, check in to the merchant or location. In some embodiments, a merchant may have a notification, sign, placard, alert, e-mail message, and the like, that informs user 110 of the benefits of authenticating with remote server 104 when visiting the merchant's store. User 110 may also be provided with information regarding benefits and advantages of tying a credential used for authenticating with remote server 104 with the device identifier of client computing device 102.

To match the device identifier with the credential, remote server 104 may need to match the device sending the device identifier with the device sending the request for authentication. Consequently, remote server 104 may send a stream of packets to client computing device 102. In some embodiments, the stream of packets may have a predetermined length and a predetermined timing. For example, the stream of packets may include packets having increasing lengths, such as 1 byte, 2 bytes, 3 bytes, 5 bytes etc. Moreover, the stream of packets may have a predetermined separation between each packet to create a packet timing. The separation may be variable between each packet. In general, the stream of packets may have a predetermined timing and length such that the reception and/or retransmission of these packets may be easily identifiable.

For example, since client computing device 102 may be connected to remote server 104 over network 106 via access point 108, the packet stream may be passed to client computing device 102 via access point 108. Access point 108, which may know the device identifier of client computing device 102 since client computing device 102 is connected to network 106 via access point 108 may monitor the network traffic associated with the packet stream to determine the device identifier receiving and/or retransmitting the packet stream. Access point 108 may then send the device identifier associated with the packet stream to remote server 104. In some embodiments, access point 108 may be configured to send a device identifier and network traffic associated with the device identifier to remote server 104 based on rules received by remoter server 104. For example, the rules may specify that access point 108 is to send packet sizes for any device identifier that sends or receives more than 10 packets in 5 seconds, which may be consistent with the stream of packets sent by remote server 104. Based on information provided to remote server 104 by access point 108, remote server 104 may identify a device identifier that is sending or receiving the stream of packets, and then authenticate the device associated with the device identifier, and match the credential with the device identifier. The matched device identifier and authentication credential may then be stored in account information 122 of account database 120. Consequently, the next time client computing device 102 connects to network 106 via access point 108, access point 108 will send the device identifier from the received broadcast packet to remote server 104, and remote server 104 may automatically authenticate client computing device 102 using the authentication credential matched to the device identifier which may be used, in some embodiments, to check user 110 into a merchant or location associated with access point 108.

Figure 4:
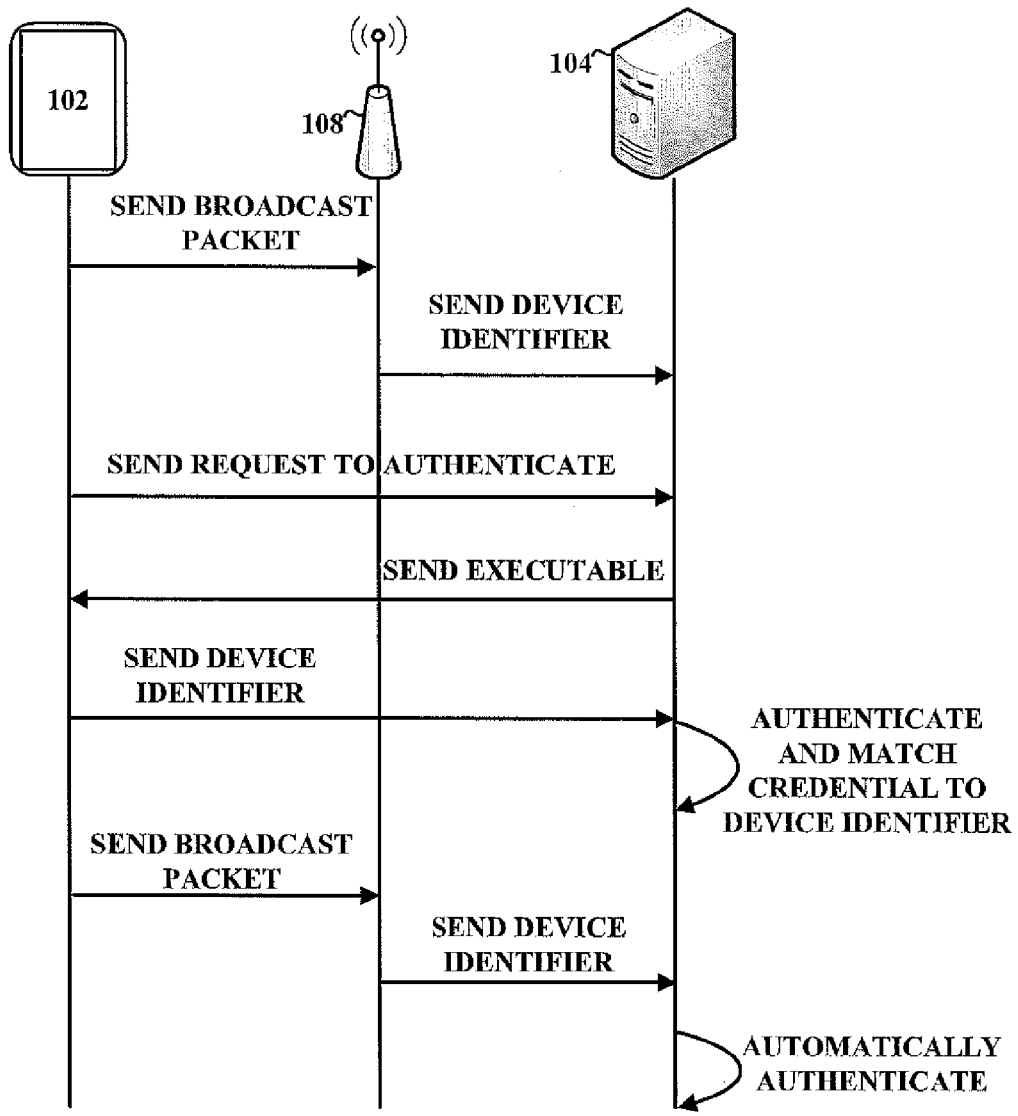
FIG. 4 is a diagram illustrating a flow of authenticating using a device identifier, consistent with some embodiments.

FIG. 4 is a diagram illustrating a flow of authenticating using a device identifier, consistent with some embodiments. As shown in FIG. 3, client computing device 102 may send out one or more broadcast packets that include a device identifier of client computing device 102 when client computing device 102 is attempting to connect to network 106. Access point 108 may receive any number of these broadcast packets and device identifiers as client computing devices 102 pass within range of access point 108. Access point 108 may provide these device identifiers among other information to remote server 104 based on rules provided to access point 108 from remote server 104. Client computing device 102 may then send a request to authenticate with remote server 104 to, for example, check in to a location or merchant associated with access point 108 and/or to access features provided by remote server 104, such as those discussed previously. The request may include a credential used for authenticating with remote server 104. In some embodiments, a merchant may have a notification, sign, placard, alert, e-mail message, and the like, that informs user 110 of the benefits of authenticating with remote server 104 when visiting the merchant's store. User 110 may also be provided with information regarding benefits and advantages of tying a credential used for authenticating with remote server 104 with the device identifier of client computing device 102.

To match the device identifier with the credential, remote server 104 may need to match the device sending the device identifier with the device sending the request for authentication. Consequently, remote server 104 may send an executable that, when executed by processing component of client computing device 102, sends the device identifier of client computing device 102 to remote server 104. Remote server 104 may then authenticate client computing device 102 to remote server 104 and match the credential with the device identifier. The matched device identifier and authentication credential may then be stored in account information 122 of account database 120. Consequently, the next time client computing device 102 connects to network 106 via access point 108, access point 108 will send the device identifier from the received broadcast packet to remote server 104, and remote server 104 may automatically authenticate client computing device 102 using the authentication credential matched to the device identifier.

Figure 5:
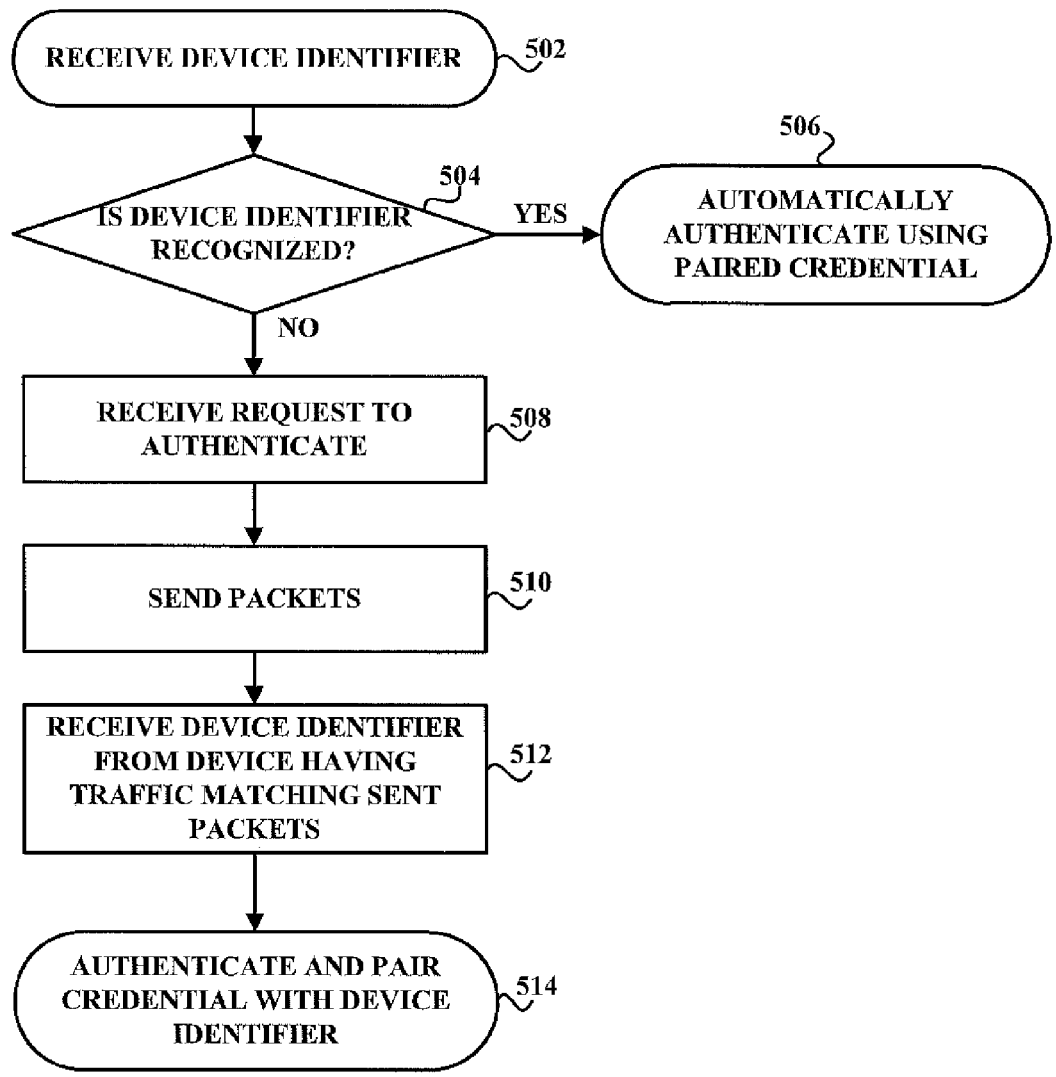
FIG. 5 is a flowchart illustrating a method for authenticating using a device identifier, consistent with some embodiments.

FIG. 5 is a flowchart illustrating a method for authenticating using a device identifier, consistent with some embodiments. For the purpose of illustration, FIG. 5 may be described with reference to any of FIGS. 1-4. The method shown in FIG. 5 may be embodied in computer-readable instructions for execution by one or more processors such that the steps of the method may be performed by remote server 104. As shown in FIG. 5, remote server 104 may receive a device identifier (502). In some embodiments, client computing device 102 may send out one or more broadcast packets that include a device identifier of client computing device 102 when client computing device 102 is attempting to connect to network 106. Access point 108 may receive any number of these broadcast packets and device identifiers as client computing devices 102 pass within range of access point 108. Access point 108 may provide these device identifiers amongst other information to remote server 104. Remote server 104 may then determine if the device identifier is recognized (504). For example, remote server 104 may determine if the device identifier is matched to an authentication credential stored in account information 122 of account database 120. If the device identifier is recognized, remote server 104 may automatically authenticate client computing device 102 to remote server 104 based on the received device identifier (506).

If the received device identifier is not recognized, remote server 104 may receive a request to authenticate (508). In some embodiments, client computing device 102 may send a request to authenticate with remote server 104 to, for example, check in to a merchant or other location associated with access point 108 to access features provided by remote server 104. The received request may include a credential used for authenticating with remote server 104. In some embodiments, a merchant may have a notification, sign, placard, alert, e-mail message, and the like, that informs user 110 of the benefits of authenticating with remote server 104 when visiting the merchant's store. User 110 may also be provided with information regarding benefits and advantages of tying a credential used for authenticating with remote server 104 with the device identifier of client computing device 102.

In response to receiving the request to authenticate, remote server 104 may send a stream of packets to client computing device 102 (510). In some embodiments, the stream of packets may have a predetermined length and a predetermined timing. For example, the stream of packets may include packets having increasing lengths, such as 1 byte, 2 bytes, 3 bytes, 5 bytes etc. Moreover, the stream of packets may have a predetermined separation between each packet to create a packet timing. The separation may be variable between each packet. In general, the stream of packets may have a predetermined timing and length such that the reception and/or retransmission of these packets may be easily identifiable.

Remote server 104 may then receive information from access point 108 related to traffic patterns matching the sent packets (512). The device identifier may be received from access point 108. The information may include device identifiers, specific packets, a packet stream, and the like. In some embodiments, access point 108 may be provided rules from remote server 104 for passing information regarding observed network traffic. For example, client computing device 102 may be connected to remote server 104 over network 106 via access point 108 and, thus, the sent packet stream may be passed to client computing device 102 via access point 108. Access point 108, which may know the device identifier of client computing device 102 since client computing device 102 is connected to network 106 via access point 108 may monitor the network traffic associated with the packet stream to determine the device identifier receiving and/or retransmitting the packet stream, and this information may be provided to remote server 104. Remote server 104 may then authenticate client computing device 102 to remote server 104 and match or pair the credential with the device identifier (514). The matched device identifier and authentication credential may then be stored in account information 122 of account database 122. Consequently, the next time client computing device 102 connects to network 106 via access point 108, remote server 104 may receive the device identifier from access point 108 (502), remote server 104 may recognize the device identifier (504) and authenticate client computing device 102 using the paired credential (506).

Figure 6:
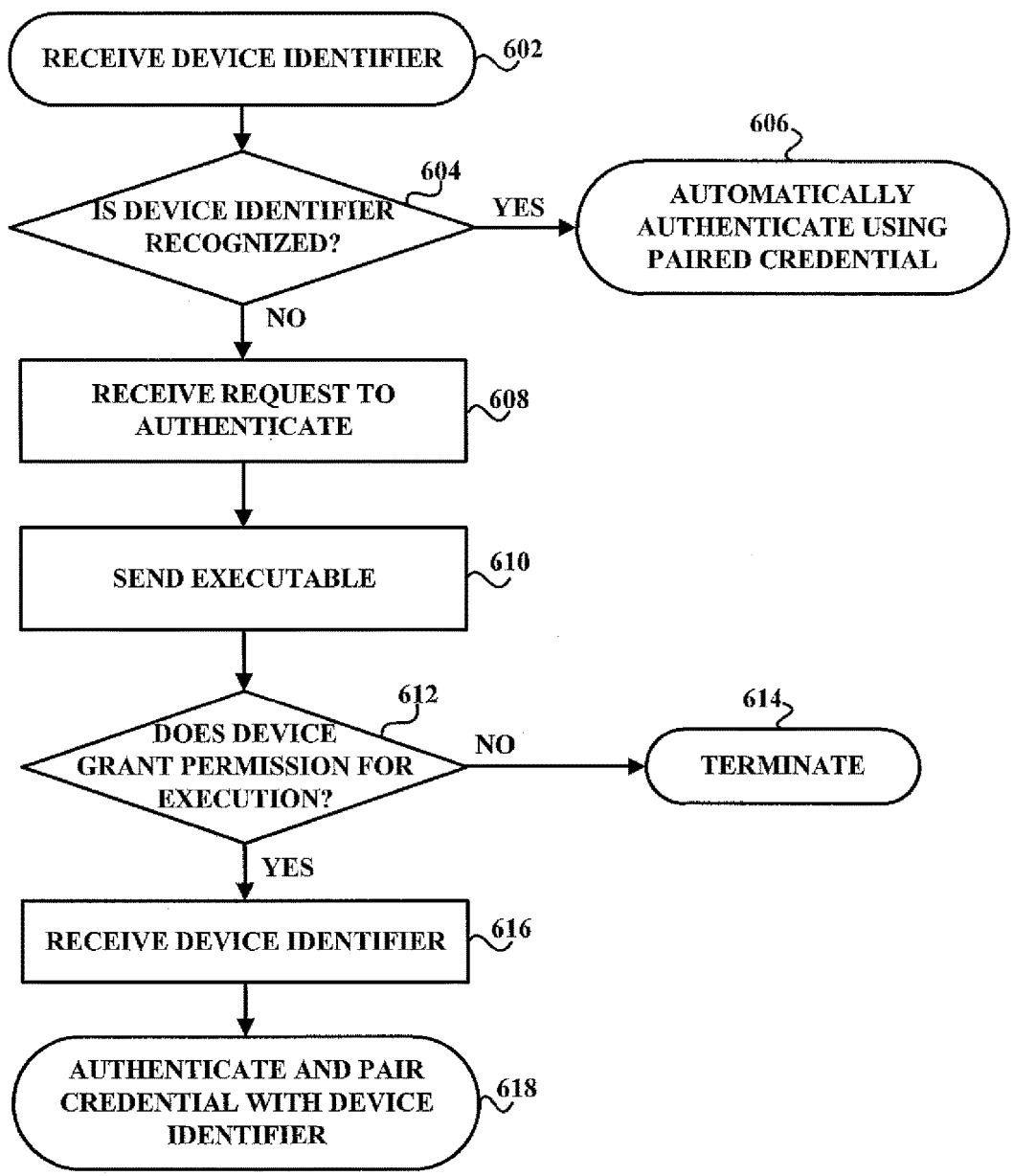
FIG. 6 is a flowchart illustrating a method for authenticating using a device identifier, consistent with some embodiments.

FIG. 6 is a flowchart illustrating a method for authenticating using a device identifier, consistent with some embodiments. For the purpose of illustration, FIG. 6 may be described with reference to any of FIGS. 1-4. The method shown in FIG. 6 may be embodied in computer-readable instructions for execution by one or more processors such that the steps of the method may be performed by remote server 104. As shown in FIG. 6, remote server 104 may receive a device identifier (602). In some embodiments, client computing device 102 may send out one or more broadcast packets that include a device identifier of client computing device 102 when client computing device 102 is attempting to connect to network 106. Access point 108 may receive any number of these broadcast packets and device identifiers as client computing devices 102 pass within range of access point 108. Access point 108 may provide these device identifiers amongst other information to remote server 104. Remote server 104 may then determine if the device identifier is recognized (604). For example, remote server 104 may determine if the device identifier is matched to an authentication credential stored in account information 122 of account database 120. If the device identifier is recognized, remote server 104 may automatically authenticate client computing device 102 to remote server 104 based on the received device identifier (606).

If the received device identifier is not recognized, remote server 104 may receive a request to authenticate (608). In some embodiments, client computing device 102 may send a request to authenticate with remote server 104 to, for example, access features provided by remote server 104. The received request may include a credential used for authenticating with remote server 104. In some embodiments, a merchant may have a notification, sign, placard, alert, e-mail message, and the like, that informs user 110 of the benefits of authenticating with remote server 104, for example to check in at the merchant's store, when visiting the merchant's store. User 110 may also be provided with information regarding benefits and advantages of tying a credential used for authenticating with remote server 104 with the device identifier of client computing device 102.

In response to receiving the request to authenticate, remote server 104 may send executable instructions to client computing device 102 (610). The executable instructions may require the permission of client computing device 102, provided by user 110, to execute (612), and if permission is not granted, the method may terminate (614). If permission is granted, the executable instructions may instruct client computing device 102 to send the device identifier of client computing device 102 to remote server 104, which may then receive the sent device identifier (616). Remote server 104 may then authenticate client computing device 102 to remote server 104 and match or pair the credential with the device identifier (618). The matched device identifier and authentication credential may then be stored in account information 122 of account database 122. Consequently, the next time client computing device 102 connects to network 106 via access point 108, remote server 104 may receive the device identifier amongst other information from access point 108 (602), remote server 104 may recognize the device identifier (604) and authenticate client computing device 102 using the paired credential (606).

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide systems and methods for authentication using a device identifier of a computing device. In particular, embodiments as disclosed herein may allow a server to match a device identifier of a device with an authentication credential such that the device may be able to be automatically authenticated to the server upon subsequent receipts of the device identifier. The examples provided above are exemplary only and are not intended to be limiting. One skilled in the art may readily devise other systems consistent with the disclosed embodiments which are intended to be within the scope of this disclosure. As such, the application is limited only by the following claims.

The invention claimed is:

1. A method comprising:
receiving, by a system, an initial authentication request from a mobile device that has been detected by an access point, wherein the mobile device is not associated with authentication credentials stored at the system;
in response to authenticating the mobile device, sending, by the system to the mobile device, a packet stream having one or more packet characteristics;
receiving, from the access point, a communication, wherein the communication corresponds to information that is received by the access point from the mobile device subsequent to the sending the packet stream to the mobile device;
storing, by the system, first authentication credentials for the mobile device in response to determining, by the system, that the communication corresponds to the packet stream sent to the mobile device, wherein the determining includes comparing one or more characteristics of the communication with the one or more packet characteristics; and
based on the stored first authentication credentials, automatically authenticating the mobile device in a subsequent instance to the initial authentication request where the mobile device is detected by the access point.

2. The method of claim 1, wherein the one or more packet characteristics comprises a packet characteristic selected from a group consisting of a predetermined packet length and a predetermined packet timing.

3. The method of claim 1, wherein the automatically authenticating is performed without requiring a user of the mobile device to manually submit the first authentication credentials, and wherein the comparing the one or more characteristics of the communication comprises matching a predetermined packet length of the communication with a predetermined packet length of the packet stream.

4. The method of claim 1, wherein the communication comprises a unique device identifier associated with the mobile device, the method further comprising:
associating the unique device identifier with the first authentication credentials.

5. The method of claim 4, wherein the unique device identifier comprises an identifier selected from a group consisting of a media access control (MAC) address and an International Mobile Station Equipment Identity (IMEI) number.

6. The method of claim 1, wherein the access point comprises a device selected from a group consisting of a wireless access point and a mobile phone base station.

7. A non-transitory computer readable medium storing computer-executable instructions, that in response to execution by a server, causes the server to perform operations comprising:
receiving an initial authentication request from a mobile device of a user, the mobile device having been detected by an access point, wherein the mobile device is not associated with authentication credentials stored at the server;
in response to authenticating the mobile device, transmitting, to the mobile device, a packet stream having one or more packet characteristics;
receiving, from the access point, a communication corresponding to information that is received by the access point from the mobile device, the information received by the access point subsequent to the transmitting the packet stream to the mobile device;
storing first authentication credentials for the mobile device in response to determining, by the server, that the communication corresponds to the packet stream sent to the mobile device, wherein the determining includes comparing one or more characteristics of the communication with the one or more packet characteristics;
based on the stored first authentication credentials, automatically authenticating the mobile device in a subsequent instance to the initial authentication request where the mobile device is detected by the access point.

8. The non-transitory computer readable medium of claim 7, wherein the automatically authenticating is performed without requiring the user of the mobile device to manually submit the first authentication credentials, and wherein the comparing the one or more characteristics of the communication comprises matching a predetermined packet length of the communication with a predetermined packet length of the packet stream.

9. The non-transitory computer readable medium of claim 7, wherein the communication comprises a unique device identifier associated with the mobile device, and the unique device identifier comprises an identifier selected from a group consisting of a Media Access Control (MAC) address and an International Mobile Station Equipment Identity (IMEI) number.

10. The non-transitory computer readable medium of claim 7, wherein the packet stream is transmitted to the mobile device via the access point.

11. The non-transitory computer readable medium of claim 10, wherein the one or more packet characteristics comprises a packet characteristic selected from a group consisting of a predetermined packet length and a predetermined packet timing.

12. The non-transitory computer readable medium of claim 7, wherein the communication comprises a unique device identifier associated with the mobile device, and wherein the operations further comprise:
associating the unique device identifier of the mobile device with the stored first authentication credentials.

13. The non-transitory computer readable medium of claim 12, wherein the unique device identifier comprises an identifier selected from a group consisting of a media access control (MAC) address and an International Mobile Station Equipment Identity (IMEI) number.

14. The non-transitory computer readable medium of claim 7, wherein the access point comprises a device selected from a group consisting of a wireless access point and a mobile phone base station.

15. An authentication system, comprising:
a non-transitory memory storing instructions; and
one or more processors coupled to the non-transitory memory and configured to read the instructions from the non-transitory memory to cause the system to perform operations comprising:
receiving an initial authentication request from a mobile device that has been detected by an access point, wherein the mobile device is not associated with authentication credentials stored at the system;
in response to authenticating the mobile device, sending, to the mobile device, a packet stream having one or more packet characteristics;
receive, from the access point a communication, wherein the communication corresponds to information that is received by the access point from the mobile device subsequent to the sending the packet stream to the mobile device;
storing first authentication credentials for the mobile device in response to determining, by the system, that the communication corresponds to the packet stream sent to the mobile device, wherein the determining includes comparing one or more characteristics of the communication with the one or more packet characteristics; and
based on the stored first authentication credentials, automatically authenticating the mobile device in a subsequent instance to the initial authentication request where the mobile device is detected by the access point.

16. The system of claim 15, wherein the one or more packet characteristics comprises a packet characteristic selected from a group consisting of a predetermined packet length and a predetermined packet timing.

17. The system of claim 15, wherein the automatically authenticating is performed without requiring a user of the mobile device to manually submit the first authentication credentials, and wherein the comparing the one or more characteristics of the communication comprises matching a predetermined packet length of the communication with a predetermined packet length of the packet stream.

18. The system of claim 15, wherein the communication comprises a unique device identifier associated with the mobile device, the operations further comprising:
associating the unique device identifier of the mobile device.

19. The system of claim 18, wherein the unique device identifier comprises an identifier selected from a group consisting of a media access control (MAC) address and an International Mobile Station Equipment Identity (IMEI) number.

20. The system of claim 15, wherein the access point comprises a device selected from a group consisting of a wireless access point and a mobile phone base station.

\* \* \* \* \*